(12) United States Patent
Murakami et al.

(10) Patent No.: US 6,817,441 B2
(45) Date of Patent: Nov. 16, 2004

(54) SHAPE MEMORY FOAM MEMBER AND METHOD OF PRODUCING THE SAME

(75) Inventors: Atsushi Murakami, Hamamatsu (JP); Kazuo Nishimoto, Hamamatsu (JP); Takahiro Niwa, Minato-ku (JP)

(73) Assignee: Nichias Corporation, Tokyo (JP)

(*) Notice: Subject to any disclaimer, the term of this patent is extended or adjusted under 35 U.S.C. 154(b) by 276 days.

(21) Appl. No.: 09/781,953

(22) Filed: Feb. 14, 2001

(65) Prior Publication Data

US 2001/0018120 A1 Aug. 30, 2001

(30) Foreign Application Priority Data

Feb. 14, 2000 (JP) ........................................ P.2000-035302
Feb. 14, 2000 (JP) ........................................ P.2000-035303

(51) Int. Cl.[7] ............................. E04B 1/84; B62D 33/00
(52) U.S. Cl. ........................ 181/204; 181/294; 296/39.3; 296/211
(58) Field of Search ..................... 181/204, 294, 181/284, 286, 198, 205, 210, 211, 149, 200, 202, 203; 296/198, 39.3, 211; 428/613, 36.5, 71, 158, 308.4, 317.3, 411.1, 421, 423.1; 106/2; 252/62, 62.3; 264/45.1, 321, 50, 51, 54, 331.19

(56) References Cited

U.S. PATENT DOCUMENTS

| | | | | |
|---|---|---|---|---|
| 3,420,363 A | * | 1/1969 | Blickensderfer | 206/46 |
| 4,181,780 A | * | 1/1980 | Brenner et al. | 264/345 |
| 4,193,899 A | * | 3/1980 | Brenner et al. | 524/216 |
| 4,990,545 A | * | 2/1991 | Hourai et al. | 427/261 |
| 5,032,622 A | * | 7/1991 | Herrington et al. | 521/99 |
| 5,049,591 A | * | 9/1991 | Hayashi et al. | 264/345 |
| 5,189,110 A | * | 2/1993 | Ikematu et al. | 264/230 |
| 5,286,576 A | * | 2/1994 | Srail et al. | 428/297.4 |
| 6,237,717 B1 | * | 5/2001 | Osanai et al. | 181/204 |
| 6,388,043 B1 | * | 5/2002 | Langer et al. | 525/415 |
| 2001/0036970 A1 | * | 11/2001 | Park | 521/50 |
| 2001/0036975 A1 | * | 11/2001 | Park | 521/134 |
| 2002/0073654 A1 | * | 6/2002 | Anderson | 53/436 |

FOREIGN PATENT DOCUMENTS

| | | | | |
|---|---|---|---|---|
| DE | 197 39 778 | | 3/1998 | |
| JP | 48-1903 | | 1/1973 | |
| JP | 05272061 A | * | 10/1993 | ........ D06M/15/564 |
| JP | 7-39506 | | 5/1995 | |
| JP | 9-132668 | | 5/1997 | |
| JP | 9-309986 | | 12/1997 | |
| JP | 10-110059 | | 4/1998 | |

\* cited by examiner

*Primary Examiner*—Kimberly Lockett
*Assistant Examiner*—Patrick Miller
(74) *Attorney, Agent, or Firm*—Nixon & Vanderhye P.C.

(57) ABSTRACT

A shape memory foam member is disclosed. A coefficient of water absorption of the shape memory foam member is in the range between 0.01 g/cm$^3$ and 0.2 g/cm$^3$ in a non-compressed state. The shape memory foam member is compressed with heating; cooled with keeping the shape memory foam member in the compressed state; and released from the compressive pressure on the shape memory foam member after cooling. The original shape of the shape memory foam member is substantially recovered by heating.

14 Claims, 2 Drawing Sheets

SHAPE MEMORY FOAM MEMBER AND METHOD OF PRODUCING THE SAME

BACKGROUND OF THE INVENTION

1. Field of the Invention

The present invention relates to a foam member having shape memory property. Especially, the present invention relates to a foam member used for fluid sealing, soundproofing, and thermal insulation and to a method of producing the same.

Further, the present invention relates to an engine noise-proof cover for the purpose of reducing noise made by a car engine.

2. Description of the Related Art

Various kinds of foam materials such as a urethane foam and silicon sealants such as liquid hardening sealant are widely used for fluid sealing, soundproofing, and thermal insulation in joints of buildings, industrial machinery, and automobiles. In order to obtain enough performances of fluid sealing, soundproofing, and thermal insulation, gaps between joints of structures need to be filled up with theses materials.

A conventional foam member are attached on a portion where a process such as fluid sealing, soundproofing, and thermal insulation is necessary (hereinafter, referred as a "processed portion") in a compressed state, and the foam member fills gaps between joints by recovering the thickness with an elastic force of the foam member itself. However, since the conventional foam member recovers its original shape as soon as a pressure thereon is released, the foam member or an assembly using the foam member need to be attached on the processed portion with keeping the foam member compressed against its recovery force. Therefore, operatability of attachment is very low.

If the foam member is thin, the operatability of attachment is improved. However, the performances of fluid sealing, soundproofing, and thermal insulation becomes insufficient since gaps are generated between the structure and the foam member in the processed portion. Alternatively, the recovery force of the foam member at the compressed state can be decreased by using a soft foam member, but its effect is slight. On the contrary, since use of the soft foam member results in lowering strength of the foam member, a life of the foam member is shortened. Especially, the performance of fluid sealing becomes inferior. As discussed above, each performance of fluid sealing, soundproofing, and thermal insulation and the operatability of attachment were hardly accomplished at the same time. Therefore, a foam member satisfying each performance at the same time is demanded.

On the other hand, a sealant of liquid hardening type such as a silicon sealant is also used. In the case of such a sealant, a material in liquid form is poured into gaps of the processed portion, and the gaps are filled by hardening the material with a chemical reaction or volatility of a volatile material such as a solvent. However, the sealant of liquid hardening type necessitates a long time for a sealing operation, and it takes a long time for hardening the material itself.

According to Japanese published examined patent application Sho. 48-1903, an elastic synthetic resin impregnated with a viscous resin composite is compressed, and the resin is restored with using hysteresis of time-recovery in order to fill a gap. However, since this method necessitates a complicated process such as impregnation of a viscous resin composite, the cost becomes high.

According to Japanese published unexamined patent applications Hei. 10-110059 and 9-132668, a shape-recovery foam element consisting of a closed-cell resin foam element is disclosed. However, there is a problem that enough performances of fluid sealing, soundproofing, and thermal insulation cannot be obtained immediately since this foam element necessitates a long time, e.g. dozens of days, for recovering the original shape.

Japanese published examined patent application Hei. 7-39506 (JP-B-7-39506) discloses a shape-memory polymer foam element made of urethane, and Japanese published unexamined patent application Hei. 9-309986 (JP-A-9-309986) discloses a shape-memory vulcanized rubber molding in which rubber is blended with resin. Further, it is known that polynorborenene and styrene-butadiene copolymer can be made as a shape memory polymer; therefore, a foam element having a shape recovery characteristic can be obtained with these materials. However, in order to produce the foam element with a shape recovery characteristic, some specific materials, which is difficult to obtain, are necessary, and special producing plants are also necessary. Therefore, this kind of foam elements is not widely used.

Hereinafter, a conventional engine soundproof cover is discussed in detail.

In order to prevent noise generated from a car engine, the engine is usually covered with an engine soundproof cover. For example, FIG. 1 is a perspective view showing an engine soundproof cover 10 for use in a V-type engine 20. The engine soundproof cover 10 is formed so that a foam member 12 is provided as a soundproof member substantially all over the engine-side surface (inner surface) of a cover body 11 made of metal or resin. The engine soundproof cover 10 is fixed to fastening holes 15 provided in an intake manifold 13, an intake collector 14, and the like, by bolts (not shown).

In addition, the shape of the engine 20 is complicated. Accordingly, the engine soundproof cover 10 is attached to the engine 20 in the state where the foam member 12 is compressed in the direction of its thickness. Then, the thickness of the foam member 12 is recovered by an elastic force of the foam member 12 itself so as to fill up a gap between the cover body 11 and the engine 20. Thus, the soundproof effect is enhanced. However, usually, the foam member 12 recovers its thickness immediately as soon as the pressure is released. It is therefore necessary to attach the engine-proof cover 10 to the engine 20 while keeping the compressed foam member 12 in the compressed state against the recovery force of the foam member 12. Thus, the operatability of attachment is very low.

If the foam member 12 is made thin, the workability on attachment is improved. However, there appears a gap between the foam member 12 and the engine 20 so that the soundproof performance becomes insufficient. Although the recovery force from the compressed state can be lowered by use of a soft foam member 12, the effect is slight. If anything, reduction in the strength of the foam member 12 caused thereby leads to a problem such as shortening of the life.

Although it is also considered to mold the foam member 12 in accordance with the shape of the engine 20, it is necessary to prepare the foam member 12 for every kind of engine 20 and for every attachment place if such foam members 12 are attached to a plurality of places of the engine 20. Thus, the product cost is increased. In addition, because the foam member 20 is not brought into pressure contact with the engine 20, it is inevitable to generate a gap, though it is small, between the foam member 12 and the engine 20. Thus, there is a problem also in the point of view of the soundproof performance.

SUMMARY OF THE INVENTION

In view of the above circumstances, a first object of the present invention is to provide a foam member which is excellent in performances of fluid sealing, soundproofing, and thermal insulation, is excellent in the operatability of attachment to the processed portion, and is obtained at low cost without requiring a special material and equipment for producing.

Further, as discussed above, since the operatability of attachment of the engine soundproof cover to the engine is incompatible with the soundproof performance thereof. It is therefore a second object of the present invention to provide an engine soundproof cover which is excellent both in operatability of attachment and soundproof performance.

The inventors of the present invention made diligent investigation to solve the foregoing problem. As a result, the present inventors reached the following discovery. If a shape recovery foam member of the present invention is treated with the specific process which does not require special equipment, that is, releasing pressure after cooling in the state where the foam member is compressed after heating and compressing, then the compressed shape of the foam member is retained in the state where an external force is not applied in the normal temperature, and the thickness of the foam member is recovered by heating. Each satisfactory performance of fluid sealing, soundproofing, and thermal insulation is obtained by using the above shape memory foam member in a processed portion, and an operation of attachment can be easily performed. The present invention is based on such knowledge.

In order to attain the above objects, a foam member of the present invention is characterized as follows. A foam member having a coefficient of water absorption in a range between 0.01 g/m$^3$ and 0.2 g/m$^3$ is heated and compressed. With keeping the compressed state, the foam member is cooled. Then, the foam member is obtained by releasing the pressure. The foam member substantially recovers its original shape, which is the shape before compression, by heating. Further, a method of producing a foam member of the present invention is characterized as follows. A foam member having a coefficient of water absorption in a range between 0.01 g/m$^3$ and 0.2 g/m$^3$ is heated and compressed. With keeping the compressed state, the foam member is cooled. Then, the shape in the compressed state is retained after releasing the pressure.

Further, the inventors of the present invention made diligent investigation to solve the foregoing problem. As a result, the present inventors reached the following discovery. That is, if a shape memory foam member kept to be compressed in its thickness direction was used for an engine soundproof cover, the operatability of attachment of the engine soundproof cover to an engine was improved conspicuously. Then, the compressed shape memory foam member recovered its approximately original shape (thickness) before compression by heating or occasionally by heat generated from idling of the engine. As a result, the gap between a cover body and the engine was filled up by the shape memory foam member so that satisfactory soundproof performance could be obtained. The present invention is based on such knowledge.

That is, in order to achieve the above object, according to the present invention, there is provided an engine soundproof cover disposed to cover an engine, characterized in that a shape memory foam member is provided on a surface of the soundproof cover which covers the engine. Particularly, the shape memory foam member is a foam member which is obtained by heating and compressing a foam member, cooling the compressed foam member while keeping a compressed state thereof, and releasing the pressure after cooling, and which recovers an approximately original shape before compression by heating.

Further, in order to achieve the same object, according to the present invention, there is provided an engine soundproof structure comprising a soundproof cover disposed to cover an engine, characterized in that a shape memory foam member is provided on a surface of the soundproof cover which covers the engine.

DETAILED DESCRIPTION OF THE PREFERRED EMBODIMENTS

Figure 1:
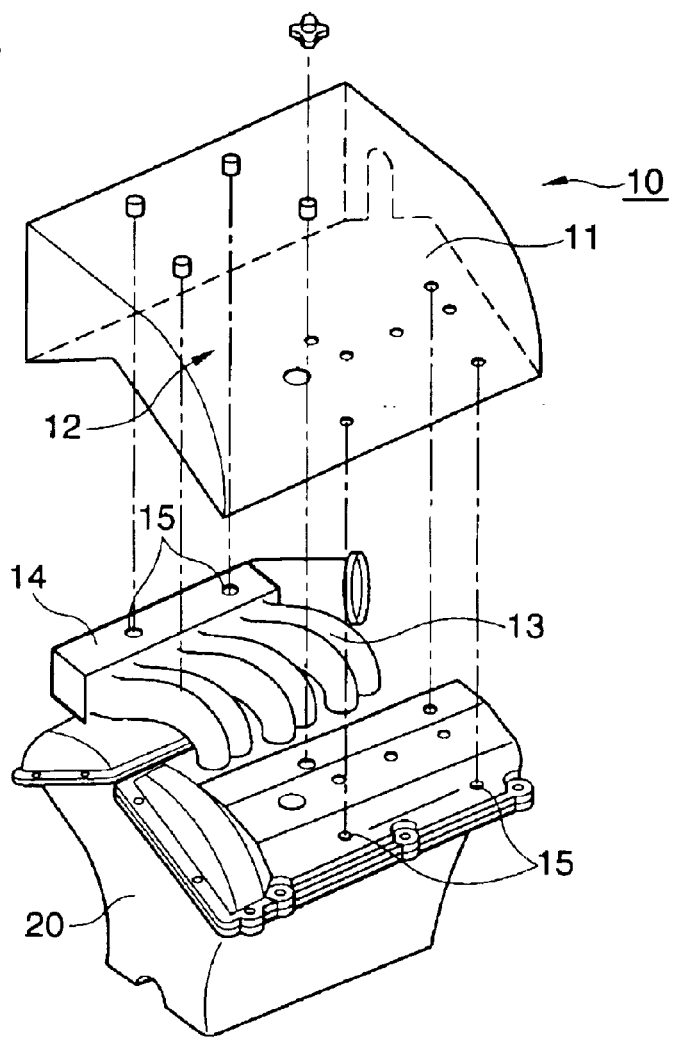
FIG. 1 is a schematic perspective view showing an example of an engine soundproof cover (for a V-type engine).

Hereinafter, the present invention is described in detail with reference to the accompanied drawings.

A shape memory foam member of the present invention is made of an existing foam material as a starting material (hereinafter, referred to as "starting foam material"). In the present invention, the existing foam member is heated and compressed. Then, it is cooled with keeping it in the compressed state, and the pressure is released after cooling.

Although various foam members may be used as starting material of the shape memory foam member, particularly in the case where a starting foam material with low bulk density is used, it is possible to obtain a shape memory foam member superior in shape retentivity and shape recoverability. Specifically, it is desired to use a starting foam material having a bulk density of preferably not more than 400 kg/cm$^3$, more preferably not more than 200 kg/cm$^3$, further preferably not more than 150 kg/cm$^3$ in non-compressed state, that is, before compression. If a starting foam material with the bulk density in this range is used, it is possible to obtain a shape memory foam member superior in shape retentivity and shape recoverability.

In addition, it is preferable that the starting foam material has a mixed-cell structure of open cells and closed cells. Generally, a foam member having an open-cell structure has a large coefficient of water absorption while a foam member having a closed-cell structure has a small coefficient of water absorption. A foam member having a mixed-cell structure of open cells and closed cells has a middle coefficient of water absorption between the aforementioned two. Therefore, if the coefficient of water absorption is specified, the ratio of open cells to closed cells can be prescribed. The coefficient of water absorption is measured by Method B of JIS K6767. It is desired in the present invention to use a starting foam material of which a coefficient of water absorption is preferably not lower than 0.01 g/cm$^3$ and lower than 0.2 g/cm$^3$, more preferably not lower than 0.02 g/cm$^3$ and lower than 0.15 g/cm$^3$, further more preferably not lower than 0.04 g/cm$^3$ and lower than 0.1 g/cm$^3$. If a starting foam material of which the coefficient of water absorption is in this range is used, it is possible to obtain a shape memory foam member superior in shape retentivity and shape recoverability.

Various polymeric materials such as rubbers, elastomers, thermoplastic resins, thermosetting resins, etc. can be used as a main component of the starting foam material. Examples of such polymeric materials include: various rubbers such as natural rubber, CR (chloroprene rubber), SBR (styrene-butadience rubber), NBR (nitrile-butadien rubber), EPDM (ethylene-propylene-diene terpolymer), silicon rubber, fluoro rubber, acrylic rubber, etc.; various elastomers such as thermoplastic elastomer, soft urethane elastomer, etc.; thermoplastic resins such as polyethylene resin, polypropylene resin, polyamide resin, polyester resin, etc.; various thermosetting resins such as hard urethane resin, phenolic resin, etc. However, the polymeric material as the main component of the starting foam material is not limited to these materials. Particularly with a starting foam material having rubber or elastomer as its main component, it is possible to obtain a shape memory foam member superior in shape retentivity and shape recoverability. Particularly a starting foam material having EPDM as its main component is generally used widely, available easily and excellent in balance among the heat resistance, the ozone resistance and the price. Therefore, the above starting foam material is preferable as the shape memory foam member.

Alternatively, for example, a commercially available foam material sheet of EPDM or NBR as a sealant for buildings or light electrical appliances may be used as the starting foam material.

Since such general-purpose foam materials may be used as the starting foam material, the shape memory foam member can be produced easily and at a low price.

The shape memory foam member can be produced in the following manner. That is, the starting foam material is heated and compressed in the thickness direction. After the compressed material is cooled while keeping its compressed state, the pressure is released. For example, the starting foam material is heated and compressed by a hot press and then cooled while being compressed. Alternatively, the starting material may be heated in an oven, and after it is taken out of the oven, it is immediately compressed by a press and cooled. Alternatively, a weight may be put on the starting foam material for compression without using any press. Alternatively, in order to produce the shape memory foam member continuously, a calender roll may be used to heat and compress the starting foam material by hot rollers and cool it by cold rollers while it is compressed. However, the producing method is not limited to these manners. Incidentally, the heating temperature at this time is in a range of from 50 to 200° C., and the cooling temperature is in a range of from 20 to 50° C. Since the shape memory foam member can be produced with only simple equipment, it can be produced easily and at a low price.

The aforementioned shape memory foam member which is in a state of compression can be recovered substantially to its original shape (thickness) before compression if it is heated to a predetermined temperature. This recovering temperature differs in accordance with the kind of the starting foam material, but, generally, it is in a range of from 70 to 100° C. Incidentally, the heating method is not limited specifically. For example, pressing a hot plate heated to the predetermined temperature or blowing the hot wind with a drier can be adopted.

A conventional shape memory foam member needs to be made of special materials, which are difficult to obtain. Therefore, it is not easy to obtain such a shape memory foam member. What is worse, a special equipment or facility for a starting foam material is necessary. Not to mention, according to the present invention, the above-mentioned shape memory foam member may be used, or other conventional shape memory foam members may be used. In the case where a conventional shape memory foam member is used, it is natural to use a recovering method suitable to the material. However, since the shape memory foam member according to the present invention is not limited to any starting foam material, that is, a commercially available foam material sheet can be used, it can be produced at a low cost by use of an easily available material. Further, a special equipment or operation for a starting foam material is not necessary for producing. In view of the above, it is notable that the shape memory foam member is especially preferable, for example, as the material of an engine soundproof cover.

It is necessary for a foam member of the present invention to have both shape retentivity and shape recoverability. Here, the shape retentivity means a property to keep a shape of a compressed state after pressure is released in the compressed state, and the shape recoverability means a property to recover its original shape (thickness) by heating. Therefore, it is assumed that the shape memory foam member of the present invention has independent mechanisms with respect to each of shape retentivity and shape recoverability. The inventors of the present invention assumes that the following mechanisms generates shape retentivity and shape recoverability.

(First Shape Retentive Mechanism)

Generally, a foam member is subject to a recovery force by elasticity when it is compressed. Accordingly, a shape retentive force need to be equal to or greater than a recovery force in order to generate shape retentivity. If a bulk density of a foam member is high in non-compressed state, since the foam member becomes hard and generates a strong recovery force, a shape retentive force cannot be greater than the recovery force. That is, shape retentivity is not generated. Therefore, it is preferable that a starting foam material has a low bulk density in non-compressed state. Specifically, the bulk: density is preferably in the above-mentioned range.

Further, when high-molecular materials are pressed each other with closely contacting, materials are attracted each other. That is, a bonding phenomenon is generated. If a foam member is compressed, membranes of cells are pressed with closely contacting each other, the bonding phenomenon is generated in the inside of the foam member. Bonding is generated so that molecules on the surface parts of high-molecular materials are mutually dissolved in microscopic level. However, in the room temperature, the mutual dissolution is not sufficient since molecular motion of a high-molecular material is not active. Therefore, bonding force becomes weak. In the case where the foam member is compressed in the room temperature, since bonding force between membranes of cells is weak, the foam member recovers its original thickness by an elastic force at the same time when a pressure is released.

By applying heat as well as applying pressure with close contact, molecular motion becomes active on the surface portion of the material, and a phenomenon of the mutual dissolution is liable to be generated. In the case where a foam member is heated and compressed, the phenomenon of the mutual dissolution is generated between membranes of cells, which are closely contacted. In the case where a pressure is released in a state that a foam member is heated after the phenomenon of the mutual dissolution is generated by heating and compressing, the membranes of cells, which were closely contacted, are easily separated since molecular motion of high-molecular material is active. However, in the case where a pressure is released with keeping compressed state after cooling, the membranes of cells, which are closely contacted by mutual dissolution, are not easily separated each other since molecular motion of high-molecular material constituting membranes of cells is not active. Therefore, a strong bonding force is generated and the compressed state is retained.

According to the present invention, a starting foam material is heated and compressed; then, a pressure is released after cooling. Therefore, a strong bonding force between membranes of cells are retained. That is, the bonding force between membranes of cells of the starting foam material functions as a shape retentive force. This is the first mechanism with which a shape retentive force is generated in a shape memory foam of the present invention.

In view of the above, it is preferable that a main component of a starting foam member is a material liable to generate bonding. Since a soft high-molecular material such as a rubber and an elastomer is liable to generate bonding, the main component of a starting foam member is preferably a rubber or an elastomer as described above.

(Second Shape Retentive Mechanism)

Reduction of the recovery force is also one of effective means to generate shape retentivity. The recovery force of the foam member is composed of the elastic forces of frames, which are solid portions of a foam material, and membranes of cells and the elastic force of the air inside cells of the foam. Among these forces, the elastic force of the solid portions of the foam material is a force which always functions. There are cases where the elastic force of the air functions and does not function, and it is possible to reduce or eliminate the elastic force of the air in the case where it functions. If there are communicating portions in cells of the foam material, the communicating portion functions as a path where the air flows. When the foam member is compressed, the air in the cells is easily exhausted through the path if there are such communicating portions. Therefore, the elastic force of the air does not function since the air inside cells is exhausted. On the other hand, in the case where the foam material includes closed cells, since there is no path where the air flows, the air inside the closed cells is not easily exhausted outside even if the foam member is compressed. Accordingly, a portion composed of closed cells tries to recover its shape with the elastic force of the air. This is the elastic force inside the cells, and this force functions if the foam member includes closed cells.

If the foam member is compressed for long duration, the air inside the cells permeates the membranes even in the closed cells; but, the air is not sufficiently exhausted. However, if the foam member is compressed with heating, permeation phenomenon is liable to occur since both of molecular motion of the air and molecular motion of the high-molecular materials constituting the solid portions of the foam member become active. As a result, the air inside the closed cells is more easily exhausted through the membranes of the cells. Therefore, in the present invention, even if closed cells exist, the inside air is exhausted outside by heating and compressing the starting foam material, and the elastic force of the air is reduced or completely eliminated. This is the second mechanism with which a shape retentive force is generated in a shape memory foam of the present invention.

(Third Shape Retentive Mechanism)

Even if the foam member is heated and compressed, a path communicating a certain amount of the air is necessary inside the foam material. That is, communicating portions of the cells are still necessary. If the ratio of the closed cells is excessive, the air is not sufficiently exhausted outside since the air is not flowed inside the foam even if the foam member is heated and compressed. Therefore, a recovery force derived from the elastic force of the air is not weakened so much. In other words, the second shape retentive mechanism does not functions well if a foam material including closed cells in an excessive ratio is used.

Even if the pressure on the foam member is released in the state where the foam member is heated, the air exhausted from the closed cells to the outside by heating and compressing may permeate the membrane and flow into the closed cells again as well as being exhausted from the closed cells. This is because both of the molecular motion of the air and the molecular motion of the high-molecular materials constituting the solid portions of the foam member remains active. However, if the pressure is released after the foam member is heated and compressed in order to exhaust the air inside the closed cells to the outside, and then cooled with keeping the compressed state, both of the molecular motion of the air and the molecular motion of the high-molecular materials constituting the solid portions of the foam member become non-active. As a result, the air does not easily permeate the membranes of the cells and does not flow into the other closed cells. Therefore, in the present invention, the air is prevented from flowing into the closed cells by releasing the pressure after cooling the starting foam material which has been heated and compressed. Moreover, at this moment, the foam member is subject to the compressing force by the atmospheric pressure, and this compressing force by the atmospheric pressure is also one of the shape retentive forces functioning in the present invention. This is the third mechanism with which a shape retentive force is generated in a shape memory foam of the present invention.

If the ratio of opened cells is excessive, the air is easily flowed into the cells through paths in the communicating portions of the cells. Therefore, since the air pressure flowed into the cells functions as a reaction of the atmospheric pressure, the shape retentive force by the atmospheric pressure is not generated. In other words, the third shape retentive mechanism is not generated if a foam material including opened cells in an excessive ratio is used.

In view of the above, a structure of cells in the starting materials used for the present invention is preferably a mixed-cell structure including the opened cells and the closed cells. In the case where the ratio of the closed cells is excessive, the air inside some of the closed cells is not exhausted even if the foam member is heated and compressed. Therefore, the shape retentivity may deteriorate since the second shape retentive mechanism does not function. Moreover, in the case where the ratio of the opened cells is excessive, the air easily flows into the cells after compression. Therefore, the shape retentivity may deteriorate since the third shape retentive mechanism does not function Accordingly, the starting foam material used in the present invention has a suitable mixing ratio of the closed cells and opened cells. Specifically, the starting material preferably has the coefficient of water absorption as discussed above.

In order to generate the three shape retentive mechanism as above, the starting foam material need to be heated and compressed. In addition, the material need to be cooled with keeping the compressed state after heating and compressing. If the material is compressed without heating, a good shape retentivity is not generated. Further, if the pressure on the starting foam material is released with heating after heating and compressing, a good shape retentivity is not generated, either.

As described above, if a compressed state of a foam member is kept, the foam member has a shape retentive force greater than a shape recovery force. Accordingly, if the shape recovery force outweighs the shape retentive force, shape recoverability is generated. Therefore, in the present invention, an effective means to recover a shape is to reduce or to eliminate the shape retentive force. It is assumed that this shape recovery force is derived from the following mechanisms.

(First Shape Recovery Mechanism)

The shape recoverability of the shape memory foam member of the present invention is derived from the elastic forces of frames, which are solid portions of a foam, and membranes of cells. When a shape of the shape memory foam member of the present invention is retained, the above-mentioned shape retentive forces, that is, the bonding force between membranes of cells and the atmospheric pressure applied by compression of the closed cells, are equal to or greater than the elastic force of the solid portions of the foam. Therefore, the shape is retained in the compressed state. If the shape retentive forces, such as the bonding force between membranes of cells and the atmospheric pressure generated by compression of the closed cells, can be reduced or eliminated, the shape recoverability is generated by the elastic force of the solid portions of the foam.

In the foam member retaining the shape of the compressed state, bonding phenomenon is generated since molecular motion is non-active in the condition that high-molecular materials constituting membranes of cells are closely contacted each other. By heating the foam member, the molecular motion of the high-molecular materials constituting membranes of cells becomes active, and bonded membranes of cells are separated each other. Accordingly, the shape recoverability is generated by the elastic force of the solid portions of the foam material. That is, the compressed shape of the foam member, which is retained by the bonding force, comes not to be retained since the bonding force is lowered by applying heat. This is the first mechanism with which the shape recoverability is generated in the shape memory foam member of the present invention.

(Second Shape Recovery Mechanism)

If a foam material includes closed cells, the air cannot easily permeate the membranes of the cells and does not flow into the closed cells from the outside since both of molecular motion of the air and molecular motion of the high-molecular materials constituting the solid portions of the foam member is non-active in the foam member of which the compressed state is retained. However, by heating this foam member, both of molecular motion of the air and molecular motion of the high-molecular materials constituting the solid portions of the foam member becomes active, and the air comes to permeate membranes of the closed cells with ease. Further, the pressure of the flowed air becomes a reaction force resisting the atmospheric pressure, and the foam member, which is retained in the compressed state by the atmospheric pressure, generates the shape recoverability by the elastic force of the solid portions. That is, the shape of the foam member, which is retained in the compressed state by the atmospheric pressure, comes to be free from being retained by applying heat, and the original shape is recovered. This is the second mechanism with which the shape recoverability is generated in the shape memory foam member of the present invention.

In order to generate the above-mentioned two shape recovery mechanism, heating is necessary. Without heating, the shape retentivity remains generated, and the original shape is not easily recovered. In the present invention, heating is an indispensable condition for generating the shape recoverability.

The present inventors assumes that the above is the reasons why the shape memory foam member of the present invention generates the shape retentivity and the shape recoverability.

Incidentally, when the shape memory foam member according to the present invention is kept in custody, it is desired to keep it at a low temperature. Since the shape memory foam member recovers, by heat, its original shape before compression, it may expand gradually in its thickness direction if it is kept air-tightly for a long time particularly in summer or the like.

The shape memory foam member of the present invention can be used for the purposes of fluid sealing, soundproofing, and thermal insulation, for example, in joints of buildings, industrial machinery, and automobiles. When the foam member is equipped, a compressed state is retained. Therefore, it is not necessary to equip a foam member on a processed portion with keeping the state resisting a recovery force of the foam member in the compressed state as in the background-art foam member. Accordingly, operatability is remarkably good. In addition, since the shape recovery is performed by heat and the foam member is filled without generating a gap irrespective of a shape of a gap, performance in fluid sealing, soundproofing, and thermal insulation is also excellent. Moreover, heating for shape recovery may be omitted for industrial machinery and automobiles since heat is generated by running or driving them.

Hereinafter, a soundproof cover for an engine is exemplified as a use of the shape memory foam member according to the present invention.

A shape memory polymer for an embodiment of the present invention is a polymer material having the following characteristic. That is, the polymer material is deformable from its original thermoformed shape into another shape by a force applied thereto when the polymer is heated to a certain temperature or higher. The deformed shape is retained by setting the temperature back to the room temperature while keeping the polymer deformed. Further, when the polymer is heated to a certain temperature or higher, the polymer recovers the original thermoformed shape from the deformed shape.

For example, it is known that polynorborenene or styrene-butadiene copolymer becomes shape memory polymer. Accordingly, if a foam member is produced by using such polymer, a foam member having a shape memory property, that is, a shape memory foam member can be produced. The shape memory foam member has the following characteristic. That is, after the shape memory foam member is heated and compressed, the shape memory foam member is cooled while its compressed state is kept, then the compressed shape is retained if the pressure is released after cooling. Then, if the shape memory foam member is heated, it recovers substantially its original shape before compression.

As such a shape memory foam member, as discussed above, Japanese published examined patent application Hei.

7-39506 (JP-B-7-39506) discloses a shape-memory polymer foam element made of urethane, and JP-A-309986 discloses a shape-memory vulcanized rubber molding in which rubber is blended with resin. In the present invention, these shape memory foams maybe used. In addition, ethylene-propylene-diene terpolymer (EPDM) in which orefin resin is dispersed is available on the market by the trade name of "Mitsui Eptaroi" as a material for obtaining a shape-memory vulcanized rubber molding disclosed in JP-A-309986. This material can be used in the present invention.

Alternatively, a foam member with similar shape memory performance can be produced by use of not a shape memory polymer but a foam member which is an ordinary material. Hereinafter, a foam member with shape memory performance produced by use of a foam member which is an ordinary material will be referred to as a shape memory foam member. Since the method of producing the shape memory foam member is similar to the above-mentioned method, the detailed description is omitted.

In this embodiment, preferable starting materials for a shape memory foam member are the same materials as discussed above. Therefore, a detailed description is omitted.

For example, such a shape memory foam member is used in place of the foam member 12 of the engine soundproof cover 10 as shown in FIG. 1. That is, the shape memory foam member is provided to cover substantially the whole surface of the cover body 11 on the engine 20 side. Then, an engine soundproof cover according to the present invention is completed. Alternatively, the shape memory foam member may be provided like a band on an edge portion of the cover body 11. The arrangement of the shape memory foam member is not limited specifically. Further, the shape memory foam member and a background-art shape memory foam member may be used together. In addition, the shape memory foam member and glass wool may be used together.

Various metals such as iron, aluminum, stainless steel, etc. or various resins such as nylon, polypropylene, unsaturated polyester, etc. may be used as the material of the cover body 11. In addition, a filler and/or fibers maybe added to such various resins. Particularly, a material in which a filler and/or fibers have been added to nylon is lightweight and excellent in heat resistance and strength properties. Therefore, the material is preferable for the car soundproof cover.

To fix the shape memory foam member to the cover body 11, various means may be adopted, such as a bonding agent, a tackifier, an adhesive tape, a hot melt, etc. Alternatively, the shape memory foam member may be fixed with a pin or a clip. The method for fixing the shape memory foam member to the cover body 11 is not limited to such means.

Figure 2:
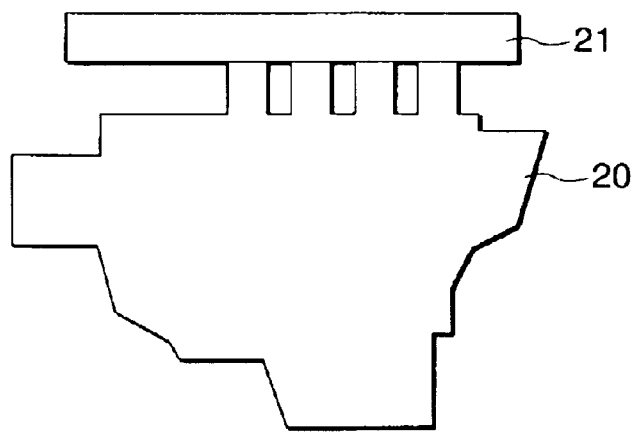
FIG. 2 is a typical view for explaining the state (before heating) where an engine soundproof cover according to the present invention is attached to an engine.
Figure 3:
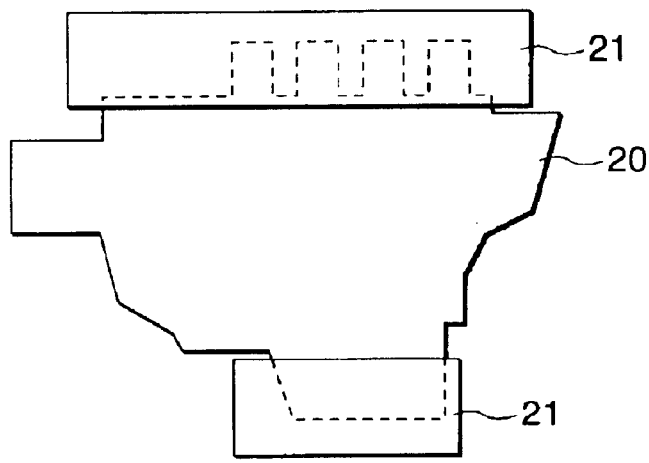
FIG. 3 is a typical view for explaining the state (after heating) where the engine soundproof cover according to the present invention is attached to the engine.

FIGS. 2 and 3 are typical views showing the state where the engine soundproof cover according to the present invention is attached to the engine. Incidentally, only the engine 20 and the shape memory foam member 21 are illustrated for the sake of simplification. As shown in FIG. 2, the engine soundproof cover according to the present invention is held in the state where the shape memory foam member 21 is compressed in its thickness direction. Differently from a background-art foam member, the shape memory foam member 21 can be attached to the engine 20 without resisting the recovery force of the compressed foam member. Thus, the workability on attachment becomes very good. That is, the foam member is easily attached to the engine 20. In this state, there is a gap between the engine 20 and the shape memory foam member 21 as illustrated. Then, as shown in FIG. 3, if the compressed shape memory foam member 21 is heated to a predetermined temperature, the shape memory foam member 21 expands in its thickness direction so as to fill the gap. Thus, the state where the shape memory foam member 21 is in tight contact with the engine 20 is obtained so that superior soundproof performance can be exhibited. Incidentally, the heating method is not limited specifically. Such a method that a hot plate heated to a predetermined temperature is pressed onto the cover body 11 or hot air is blew thereto with a dryer can be adopted.

The temperature in a bonnet often rises up to about 80° C. by idling of the engine even in a general car. Some of shape memory foam members recovers its original shape at a temperature not higher than such a temperature, for example, at about 75° C. With such a shape memory foam member, the shape memory foam member recovers its original shape only by idling of the engine without performing any special heating operation. Thus, the number of steps for attachment can be reduced.

The engine soundproof cover according to the present invention can be attached to various places of the engine 20 similarly to a background-art engine soundproof cover. For example, as shown in FIG. 3, the engine soundproof cover can be attached to the bottom portion of the engine 20 in addition to the top portion of the engine 20. Moreover, the engine soundproof cover may be attached to the front, rear or side surface of the engine 20, or may be attached to surround the whole of the engine. In addition, the engine soundproof cover may be attached partially for every apparatus which will be a noise source, such as a fuel-injection pump, an intake manifold, etc. The portion where the engine soundproof cover is attached is not limited to such parts.

When the engine soundproof cover according to the present invention is kept in custody, it is desired to keep it at a low temperature. Since the shape memory foam member recovers, by heat, its original shape before compression, it may expand gradually in its thickness direction if it is kept air-tightly for a long time particularly in summer or the like.

EXAMPLES

The present invention will be described in more detail with examples, but the present invention is not limited to such examples.

Example 1

A foam member (50 mm×50 mm) made of EPDM and having a thickness of 15 mm, a bulk density of 100 kg/m$^3$ and a coefficient of water absorption of 0.071 g/cm$^3$ in the state where it was not compressed was compressed together with a 5 mm-thick spacer by a hot press at 75° C. Immediately after the compression, the compressed state was kept for 30 minutes, and the press was cooled down to the room temperature (25° C.). After cooling, the pressure was released. Thus, a shape memory foam member was produced.

Example 2

A foam member (50 mm×50 mm) made of EPDM and having a thickness of 30 mm, a bulk density of 100 kg/m$^3$ and a coefficient of water absorption of 0.071 g/cm$^3$ in the state where it was not compressed was compressed with heating, cooled and released from the pressure as well as Example 1. Thus, a shape memory foam member was produced.

Example 3

A foam member (50 mm×50 mm) made of NBR and having a thickness of 15 mm, a bulk density of 120 kg/m$^3$ and a coefficient of water absorption of 0.058 g/cm$^3$ in the state where it was not compressed was compressed with heating, cooled and released from the pressure as well as Example 1. Thus, a shape memory foam member was produced.

Example 4

A foam member (50 mm×50 mm) made of EPDM and having a thickness of 15 mm, a bulk density of 50 kg/m$^3$ and a coefficient of water absorption of 0.056 g/cm$^3$ in the state where it was not compressed was compressed with heating, cooled and released from the pressure as well as Example 1. Thus, a shape memory foam member was produced.

Example 5

A foam member (50 mm×50 mm) made of SBR and having a thickness of 15 mm, a bulk density of 100 kg/$^3$ and a coefficient of water absorption of 0.070 g/cm$^3$ in the state where it was not compressed was compressed with heating, cooled and released from the pressure as well as Example 1. Thus, a shape memory foam member was produced.

Example 6

A foam member (50 mm×50 mm) made of natural rubber and having a thickness of 15 mm, a bulk density of 100 kg/M$^3$ and a coefficient of water absorption of 0.082 g/cm$^3$ in the state where it was not compressed was compressed with heating, cooled and released from the pressure as well as Example 1. Thus, a shape memory foam member was produced.

Comparative Example 1

A foam member (50 mm×50 mm) made of EPDM and having a thickness of 15 mm, a bulk density of 460 kg/m$^3$ and a coefficient of water absorption of 0.0028 g/cm$^3$ in the state where it was not compressed was compressed with heating, cooled and released from the pressure as well as Example 1. Thus, a shape memory foam member was produced.

Comparative Example 2

A foam member (50 mm×50 mm) made of EPDM and having a thickness of 15 mm, a bulk density of 120 kg/m$^3$ and a coefficient of water absorption of 0.0024 g/cm$^3$ in the state where it was not compressed was compressed with heating, cooled and released from the pressure as well as Example 1. Thus, a shape memory foam member was produced.

Comparative Example 3

A foam member (50 mm×50 mm) made of soft urethane and having a thickness of 15 mm, a bulk density of 25 kg/m$^3$ and a coefficient of water absorption of 0.76 g/cm$^3$ in the state where it was not compressed was compressed with heating, cooled and released from the pressure as well as Example 1. Thus, a shape memory foam member was produced.

Comparative Example 4

A foam member (50 mm×50 mm) made of natural rubber and having a thickness of 15 mm, a bulk density of 150 kg/m$^3$ and a coefficient of water absorption of 0.59 g/cm$^3$ in the state where it was not compressed was compressed with heating, cooled and released from the pressure as well as Example 1. Thus, a shape memory foam member was produced.

Comparative Example 5

A foam member (50 mm×50 mm) made of EPDM and having a thickness of 15 mm, a bulk density of 100 kg/m$^3$ and a coefficient of water absorption of 0.071 g/cm$^3$ in the state where it was not compressed was compressed together with a 5 mm-thick spacer at 25° C. (without heating). After the compressed state was kept for 30 minutes, the pressure was released. Thus, a shape memory foam member was produced.

Comparative Example 6

A foam member (50 mm×50 mm) made of EPDM and having a thickness of 15 mm, a bulk density of 100 kg/m$^3$ and a coefficient of water absorption of 0.071 g/cm$^3$ in the state where it was not compressed was compressed together with a 5 mm-thick spacer by a hot press at 75° C. After the compressed state was kept for 30 minutes, the pressure was released without cooling. Thus, a shape memory foam member was produced.

In Examples 1–6, each of foam members had a mixed-cell structure including opened cells and closed cells in the state where it was not compressed. On the other hand, in Comparative Examples 1 and 2, both of foam members had a closed-cell structure in the state where it was not compressed. Especially, in Comparative Example 1, the bulk density was high. In Comparative Examples 3 and 4, both of foam members had an open-cell structure in the state where it was not compressed. In Comparative Examples 5 and 6, both of foam members had a mixed-cell structure including opened cells and closed cells in the state where it was not compressed.

For each of Examples and Comparative Examples, two test foam members treated with operations for shape retainment were produced. One of them was used for a shape retentivity test, and the other was used for a shape recovery test. In the shape retentivity test, a test foam member was put in a thermostatic chamber at 30° C., and thickness was measured after 24 hours, 72 hours and 168 hours. In the shape recovery test, a test foam member was put in a thermostatic chamber at 75° C., and thickness was measured after 5 minutes, 10 minutes and 30 minutes. The result of each test is shown in Tables 1 and 2.

TABLE 1

Properties and Results of each Test Member

| | | Embodiment | | | | | |
|---|---|---|---|---|---|---|---|
| | | 1 | 2 | 3 | 4 | 5 | 6 |
| Compression Temperature (° C.) | | 75 | 75 | 75 | 75 | 75 | 75 |
| Pressure Releasing Temperature (° C.) | | 25 | 25 | 25 | 25 | 25 | 25 |
| Properties of Foam Member in Non-Compressed State | Material | EPDM | EPDM | NBR | EPDM | SBR | Natural Rubber |
| | Thickness (mm) | 15.1 | 30.3 | 14.9 | 15.5 | 14.7 | 15.0 |
| | Bulk Density (kg/m$^3$) | 100 | 100 | 120 | 50 | 100 | 100 |
| | Coefficient of Water Absorption (g/cm$^3$) | 0.071 | 0.071 | 0.058 | 0.056 | 0.070 | 0.082 |
| Thickness after Operation for Shape Retainment (mm) | | 4.9 | 5.5 | 5.1 | 5.0 | 5.0 | 5.2 |
| Results of Shape Retentivity Test (mm) | After 24 hours | 5.1 | 5.6 | 5.1 | 5.2 | 5.2 | 5.2 |
| | After 72 hours | 5.9 | 5.9 | 5.3 | 5.1 | 5.6 | 5.2 |
| | After 168 hours | 5.8 | 5.9 | 5.4 | 5.1 | 5.6 | 5.2 |
| Results of Shape Recovery Test (mm) | After 5 min. | 15.1 | 30.3 | 14.8 | 15.4 | 14.5 | 14.9 |
| | After 10 min. | 15.1 | 30.4 | 14.9 | 15.5 | 14.7 | 14.8 |
| | After 30 min. | 15.1 | 30.2 | 14.9 | 15.4 | 14.7 | 14.9 |

TABLE 2

Properties and Results of each Test Member

| | | Comparative Example | | | | | |
|---|---|---|---|---|---|---|---|
| | | 1 | 2 | 3 | 4 | 5 | 6 |
| Compression Temperature (° C.) | | 75 | 75 | 75 | 75 | 25 | 75 |
| Pressure Releasing Temperature (° C.) | | 25 | 25 | 25 | 25 | 25 | 25 |
| Properties of Foam Member in Non-Compressed State | Material | EPDM | EPDM | Urethane | Natural Rubber | EPDM | EPDM |
| | Thickness (mm) | 15.0 | 15.4 | 14.5 | 14.8 | 15.1 | 15.1 |
| | Bulk Density (kg/m$^3$) | 460 | 120 | 25 | 150 | 100 | 100 |
| | Coefficient of Water Absorption (g/cm$^3$) | 0.0028 | 0.0024 | 0.76 | 0.59 | 0.071 | 0.071 |
| Thickness after Operation for Shape Retainment (mm) | | 14.5 | 6.2 | 14.5 | 13.0 | 15.1 | 15.1 |
| Results of Shape Retentivity Test (mm) | After 24 hours | — | 12.3 | — | — | — | — |
| | After 72 hours | — | 14.5 | — | — | — | — |
| | After 168 hours | — | 14.5 | — | — | — | — |
| Results of Shape Recovery Test (mm) | After 5 min. | — | 15.1 | — | — | — | — |
| | After 10 min. | — | 15.0 | — | — | — | — |
| | After 30 min. | — | 14.9 | — | — | — | — |

As shown in test results, the test foam members of all of embodiments and Comparative Example 2 kept a compressed state where thickness is about 5 mm, same as the thickness of the spacer, after releasing the pressure. In the shape recovery tests, the test foam members of all of embodiments and Comparative Example 2 substantially recovered their original shapes after 5 minutes. However, in the shape retentivity tests, even though the test foam members of all of embodiments kept the same thicknesses after 168 hours, the test foam member of Comparative Example 2 recovered its thickness at least after 24 hours, and it substantially recovered its original shape with its original thickness after 72 hours. In Comparative Examples 1 and 3–6, the test foam members recovered their original shapes immediately after releasing pressure, and their shape were not retained.

As described above, according to the present invention, a shape memory foam member produced by compressing the starting material with heating, cooling it, and releasing the pressure on it has good shape retentivity and shape recoverability.

The present invention will be described in more detail with other examples for evaluating operatability of attachment and recovering performance, but the present invention is not limited to such examples.

Example 7

A foam member made of EPDM and having a thickness of 15 mm, a bulk density of 100 kg/m$^3$ and a coefficient of water absorption of 0.071 g/cm$^3$ in the state where it was not compressed was compressed together with a 5 mm-thick spacer by a hot press at 75° C. Immediately after the compression, the press was cooled down to the room temperature while the foam member was remained compressed. After cooling, the pressure was released. Thus, a shape memory foam member was produced.

Example 8

A foam member made of NBR and having a thickness of 15 mm, a bulk density of 120 kg/m$^3$ and a coefficient of water absorption of 0.058 g/cm$^3$ in the state where it was not compressed was compressed together with a 5 mm-thick spacer by a hot press at 75° C. Immediately after the compression, the press was cooled down to the room temperature while the foam member was remained compressed. After cooling, the pressure was released. Thus, a shape memory foam member was produced.

Example 9

A foam member made of polynorbornene and having a thickness of 15 mm, a bulk density of 300 kg/m$^3$ and a coefficient of water absorption of 0.0035 g/cm$^3$ in the state where it was not compressed was compressed together with a 5 mm-thick spacer by a 75° C. hot press. Immediately after the compression, the press was cooled down to the room temperature while the foam member was remained compressed. After cooling, the pressure was released. Thus, a shape memory foam member was produced.

Example 10

A foam member made of shape memory EPDM "Mitsui Eptaroi" and having a thickness of 15 mm, a bulk density of 150 kg/m$^3$ and a coefficient of water absorption of 0.062 g/m$^3$ in the state where it was not compressed was compressed together with a 5 mm-thick spacer by a hot press at 75° C. Immediately after the compression, the press was cooled down to the room temperature while the foam member was remained compressed. After cooling, the pressure was released. Thus, a shape memory foam member was produced.

Comparative Example 7

A foam member made of soft urethane and having a thickness of 15 mm, a bulk density of 25 kg/m$^3$ and a coefficient of water absorption of 0.76 g/m$^3$ was produced.

Comparative Example 8

A foam member made of EPDM and having a thickness of 15 mm, a bulk density of 100 kg/m$^3$ and a coefficient of water absorption of 0.071 g/m$^3$ was produced.

Comparative Example 9

A foam member made of EPDM and having a thickness of 5 mm, a bulk density of 100 kg/m$^3$ and a coefficient of water absorption of 0.071 g/m$^3$ was produced.

Each of the shape memory foam members in Examples 7 and 8 was based on general-purpose polymer. The shape memory foam member in Example 9 was based on polynorbornene which was a shape memory polymer. The shape memory foam member in Example 10 was based on "Mitsui Eptaroi". Each of the foam members in Comparative Examples 7 to 9 was not a shape memory one but an ordinary one.

In addition, each of the shape memory foam members in Examples 7 to 9 was 15 mm thick in the state where it was not compressed, but its shape was retained in the state where it was compressed to be 5 mm thick. Each of the foam member in Comparative Examples 7 and 8 was 15 mm thick in the state where it was not compressed, while the foam member in Comparative Example 9 was 5 mm thick in the state where it was not compressed.

In addition, each of the shape memory foam members in Examples 7, 8 and 10 and the foam members in Comparative Examples 8 and 9 had a mixed-cell structure in the state where it was not compressed. The shape memory foam member in Example 9 had a closed-cell structure in the state where it was not compressed. The foam member in Comparative Example 7 had an open-cell structure in the state where it was not compressed.

Figure 4A:
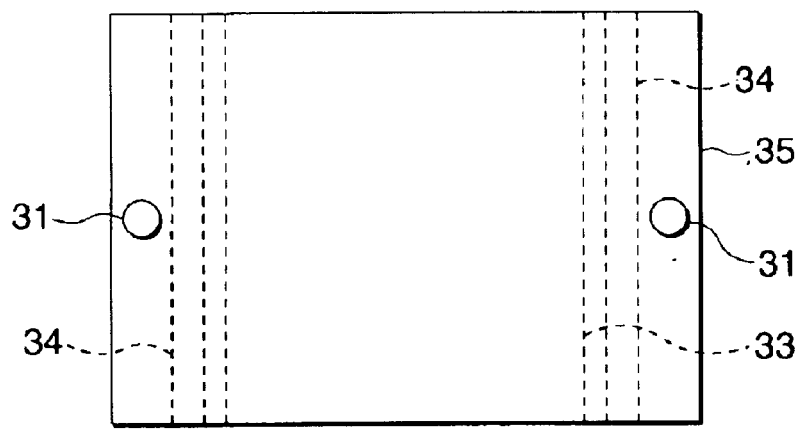
FIGS. 4(A) and 4(B) are sectional views showing an apparatus used for evaluating operatability of attachment and recovering performance in Examples.
Figure 4B:
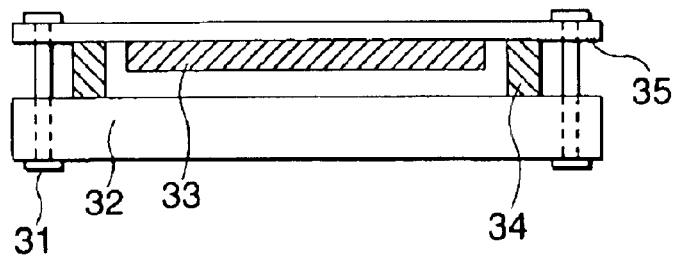

Operatability of attachment and recovering performance were evaluated with an iron plate where each of the aforementioned foam members was pasted. That is, as shown in FIGS. 4(A) and 4(B), a foam member 33 cut to be 300 by 300 mm was pasted on the center portion of an iron plate 35, which was 1 mm thick and 400 mm by 300 mm, with an adhesive tape. Portions of the iron plate where the foam member 33 was not pasted were fixed to an aluminum plate 32 through iron spacers 34 by bolts 31. The aluminum plate 32 was 10 mm thick and 400 by 300 mm, and each of the iron spacers 34 was 10 mm thick. Incidentally, the foam member 33 was made to face the aluminum plate 32. In addition, the bolts 31 were used at two places in the opposite end portions of the iron plate 35 and the aluminum plate 32, and fastened so that the gap between the iron plate 35 and the aluminum plate 32 became equal to the thickness of spacers 34. Then, after the bolts were fastened, the foam member 33, the iron plate 35, the aluminum plate 32 and the spacers 34 which were integrated with one another were held in a thermostatic chamber at 75° C. for 10 minutes. However, those only in Example 10 were held in a thermostatic chamber at 180° C. for 10 minutes.

In the evaluation of operatability of attachment, "○" was given to attachment which could be done without compressing the foam material 33 at the time of the aforementioned fixation by the bolts 31, and "X" was given to attachment which could not be done without compressing the foam material 33. On the other hand, in the evaluation of recovering performance, the existence of a gap between the foam member 33 and the aluminum plate 32 was confirmed visually after they were held in the thermostatic chamber, "○" was provided if there was no gap, while "×" was provided if there appeared a gap. The results are shown in Table 3.

TABLE 3

| | Evaluation Results | | | | | | |
|---|---|---|---|---|---|---|---|
| | Example | | | | Comparative | | |
| | 7 | 8 | 9 | 10 | 7 | 8 | 9 |
| Operatability of attachment | ○ | ○ | ○ | ○ | X | X | ○ |
| Recovering performance | ○ | ○ | ○ | ○ | ○ | ○ | X |

As shown in Table 3, each of the shape memory foam members in Examples was excellent in operatability of attachment. In addition, after the shape memory foam member was held in the thermostatic chamber, the compressed shape was recovered up to the thickness of the spacers so that there appeared no gap between the shape memory foam member and the aluminum plate. On the contrary, each of the foam members in Comparative Examples 7 and 8 needed to be compressed when the bolts were fastened. That is, the bolts had to be fastened against the compression stress of the foam member so that the operatability of attachment was very low. On the other hand, the foam member in Comparative Example 9 was excellent in operatability of attachment, but a gap appearing between the foam member and the aluminum plate remained after they were held in the thermostatic chamber.

On the assumption of an actual engine soundproof cover, according to the ordinary foam member shown in each of Comparative Examples, the operatability of attachment will deteriorate if the foam member is made thick enough to fill the gap in order to exhibit satisfactory soundproof performance. On the contrary, if the foam member is made thin in order to improve the operatability of attachment, there will appear a gap between the foam member and the engine so that the soundproof performance will deteriorate. On the other hand, with the shape memory foam member shown in each of Examples, the shape memory foam member has a compressed shape when it is attached. Accordingly, the operatability of attachment is excellent. In addition, the thickness of the shape memory foam member is recovered by heating after the attachment so as to fill the gap between the shape memory foam member and the engine. Thus, the shape memory foam member exhibits excellent soundproof performance.

As has been described, a foam member of the present invention has good performance of fluid sealing, soundproofing, and thermal insulation and further has good operatability of attachment to the processed portion. Moreover, at producing, the foam member of the present invention does not require special materials and equipment; therefore, it can be obtained at low cost.

Further, as has been described, according to the present invention, it is possible to provide an engine soundproof cover which satisfies two incompatible properties of operatability of attachment and soundproof performance on a high level.

While only certain embodiments of the invention have been specifically described herein, it will be apparent that numerous modifications may be made thereto without departing from the spirit and scope of the invention.

What is claimed is:

1. A shape memory foam member, wherein
    a coefficient of water absorption is in the range between 0.056 g/cm$^3$ and 0.082 g/cm$^3$ in a non-compressed state and a bulk density is not more than 400 kg/cm$^3$, and
    said shape memory foam member with an original shape is compressed with heating; cooled with keeping said shape memory foam member in the compressed state; and released from the compressive pressure after cooling, and
    the original shape of said shape memory foam member is substantially recovered by heating.

2. An engine soundproof cover disposed to cover an engine, comprising:
    the shape memory foam member of claim 1 provided on a surface of said soundproof cover which covers the engine.

3. The engine soundproof cover according to claim 2, wherein a bulk density is not more than 150 kg/m$^3$.

4. The engine soundproof cover according to claim 2, wherein the original shape of said shape memory foam member is substantially recovered via engine heat.

5. The shape memory foam member according to claim 1, wherein a bulk density is not more than 150 kg/m$^3$.

6. An engine soundproof structure comprising:
    a soundproof cover disposed to cover an engine,
    wherein the shape memory foam member of claim 1 is provided on a surface of said soundproof cover which covers the engine.

7. The engine soundproof structure according to claim 6, wherein a bulk density is not more than 150 kg/m$^3$.

8. The engine soundproof structure according to claim 6, wherein the original shape of said shape memory foam member is substantially recovered via engine heat.

9. A method of producing a shape memory foam member comprising:
    providing the shape memory foam member having a coefficient of water absorption in the range between 0.056 g/cm$^3$ and 0.082 g/cm$^3$ in a non-compressed state and having a bulk density not more than 400 kg/m$^3$;
    compressing the shape memory foam member with heating;
    cooling the shape memory foam member with keeping the shape memory foam member in the compressed state; and
    releasing the shape memory foam member from the compressive pressure after cooling thereby retaining a shape in the compressed state.

10. The method of producing a shape memory foam member according to claim 9, wherein a bulk density of the shape memory foam member is not more than 150 kg/m$^3$.

11. A shape memory foam member, wherein
    a coefficient of water absorption is in the range between 0.04 g/cm$^3$ and 0.1 g/cm$^3$ in a non-compressed state and a bulk density is not more than 400 kg/m$^3$, and
    said shape memory foam member with an original shape is compressed with heating; cooled with keeping said shape memory foam member in the compressed state; and released from the compressive pressure after cooling, and
    the original shape of said shape memory foam member is substantially recovered by heating.

12. A method of producing a shape memory foam member comprising:
    providing the shape memory foam member having a coefficient of water absorption in the range between 0.04 g/cm$^3$ and 0.1 g/cm$^3$ in a non-compressed state and having a bulk density not more than 400 kg/m$^3$;

compressing the shape memory foam member with heating;

cooling the shape memory foam member with keeping the shape memory foam member in the compressed state; and releasing the shape memory foam member from the compressive pressure after cooling thereby retaining a shape in the compressed state.

13. A shape memory foam member, wherein a coefficient of water absorption is in the range between 0.02 g/cm$^3$ and 0.2 g/cm$^3$ in a non-compressed state and a bulk density is not more than 400 kg/m$^3$, and said shape memory foam member with an original shape is compressed with heating; cooled with keeping said shape memory foam member in the compressed state; and released from the compressive pressure after cooling, and the original shape of said shape memory foam member is substantially recovered by heating.

14. A method of producing a shape memory foam member comprising:

providing the shape memory foam member having a coefficient of water absorption in the range between 0.02 g/cm$^3$ and 0.2 g/cm$^3$ in a non-compressed state and having a bulk density not more than 400 kg/m$^3$;

compressing the shape memory foam member with heating;

cooling the shape memory foam member with keeping the shape memory foam member in the compressed state; and releasing the shape memory foam member from the compressive pressure after cooling thereby retaining a shape in the compressed state.

\* \* \* \* \*